US010730249B2

(12) United States Patent
Modin et al.

(10) Patent No.: US 10,730,249 B2
(45) Date of Patent: Aug. 4, 2020

(54) CUTTER BLADES FOR AUTOMATED FIBER PLACEMENT MACHINES

(71) Applicant: The Boeing Company, Chicago, IL (US)

(72) Inventors: Andrew Elmer Modin, Charleston, SC (US); Allen Halbritter, Charleston, SC (US); Tu N. Hoang, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 15/938,335

(22) Filed: Mar. 28, 2018

(65) Prior Publication Data
US 2018/0215108 A1    Aug. 2, 2018

Related U.S. Application Data

(62) Division of application No. 14/991,174, filed on Jan. 8, 2016, now Pat. No. 9,950,477.

(51) Int. Cl.
*B29C 70/38* (2006.01)
*B29C 70/54* (2006.01)
*B26D 1/06* (2006.01)
*B26D 5/00* (2006.01)

(52) U.S. Cl.
CPC ............ *B29C 70/384* (2013.01); *B26D 1/065* (2013.01); *B26D 5/00* (2013.01); *B29C 70/545* (2013.01); *B29C 2793/0027* (2013.01); *B29C 2793/0081* (2013.01)

(58) Field of Classification Search
CPC ............... B29C 70/384; B29C 70/545; B29C 2793/0081; B29C 2793/0027; B26D 5/00; B26D 1/065
See application file for complete search history.

(56) References Cited

U.S. PATENT DOCUMENTS

| 2006/0137827 A1* | 6/2006 | Uneyama | B26D 1/0006 156/510 |
| 2007/0039434 A1* | 2/2007 | DeVlieg | B29C 70/32 83/13 |

FOREIGN PATENT DOCUMENTS

WO    2006060270 A1    6/2006

OTHER PUBLICATIONS

Chinese office action; dated Mar. 3, 2020; application 2016110499725.

* cited by examiner

*Primary Examiner* — Vishal I Patel
(74) *Attorney, Agent, or Firm* — Duft & Bornsen, PC (57) ABSTRACT

Systems and methods are provided for bi-directional cutters for Automated Fiber Placement (AFP) machines. One embodiment includes a bi-directional cutter for Automated Fiber Placement (AFP) manufacturing. The cutter includes a cutter body that has an upper edge and a lower edge, and has an opening placed between the upper edge and the lower edge that is dimensioned to enable passage of a tow of fiber through the cutter body. The cutter also includes a first blade disposed on the lower edge of the cutter body that is oriented to cut the tow when the cutter is driven downward, and a second blade disposed on an edge of the opening in the cutter body that is oriented to cut the tow when the cutter is driven upward.

20 Claims, 10 Drawing Sheets

CUTTER BLADES FOR AUTOMATED FIBER PLACEMENT MACHINES

FIELD

The disclosure relates to the field of composite manufacturing, and in particular, to Automated Fiber Placement (AFP) machines. AFP machines are also referred to as Advanced Fiber Placement machines.

BACKGROUND

AFP machines automatically perform composite manufacturing processes to laminate constituent materials before these materials are cured into composite parts. For example, an AFP machine may be used to form or lay up a complex shape by precisely laying out constituent materials in a predefined pattern. In such a process, the AFP machine dispenses constituent material from bundles of fiber (tows) that are impregnated with a curable resin, and places the tows in pre-defined locations. Tows of fiber may then be consolidated by a roller to build up a laminate ready for further processing, which may include compression/consolidation, removal of volatiles and curing.

During this process, cutters at the AFP machine may cut individual tows as they are dispensed by the AFP machine and laminated in order to position those tows on the composite part. The cutting process itself may involve clamping the tow, cutting the tow, and dispensing a cut portion of the tow onto the composite part. The completed laminate of constituent material may then be heated and/or compressed (e.g., in an autoclave separate from the AFP machine) to cure it into a composite part. A state-of-the-art AFP machine may even cut and start tows of material while it continuously moves across the composite part that it is manufacturing.

SUMMARY

Embodiments described herein enhance cutters that are used by AFP machines to cut tows of constituent material during the lay-up of a composite part. These cutters are enhanced to include multiple blades which are each oriented to perform cutting in a different direction. Thus, as the cutter is driven back and forth (e.g., by operation of an air piston), it cuts in both directions of motion instead of a single direction of motion. This increases the overall amount of cuts that can be performed by the cutter over the lifetime of the cutter (because it has multiple blades instead of a single blade for accepting wear), and also increases the speed at which the cutter operates (because each cut can be performed without resetting the cutter to a ready position).

One embodiment includes a bi-directional cutter for Automated Fiber Placement (AFP) manufacturing. The cutter includes a cutter body that has an upper edge and a lower edge, and has an opening placed between the upper edge and the lower edge that is dimensioned to enable passage of a tow of fiber through the cutter body. The cutter also includes a first blade disposed on the lower edge of the cutter body that is oriented to cut the tow when the cutter is driven downward, and a second blade disposed on an edge of the opening in the cutter body that is oriented to cut the tow when the cutter is driven upward.

Another embodiment is an apparatus. The apparatus includes an AFP machine. The AFP machine includes a robotic arm configured to position the AFP machine proximate to a composite part, multiple tows of fiber, and a face with multiple bi-directional cutters that are each coupled with an actuator. Each cutter includes a cutter body that has an upper edge and a lower edge, and has an opening placed between the upper edge and the lower edge that is dimensioned to enable passage of one of the tows through the cutter body. A first blade is disposed on the lower edge of the cutter body and is oriented to cut the tow when the cutter is driven downward. A second blade is disposed on an edge of the opening in the cutter body and is oriented to cut the tow when the cutter is driven upward. The AFP machine also includes a controller configured to direct the operations of the actuators to drive the cutters upward and downward.

Another embodiment is a method of cutting for an Automated Fiber Placement (AFP) machine. The method includes driving a cutter of the AFP machine downward to cut a tow of fiber at the AFP machine with a first blade of the cutter positioned on an exterior edge of the cutter. The method also includes driving the cutter of the AFP machine upward to cut a tow of fiber at the AFP machine with a second blade of the cutter positioned on an edge of the opening.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
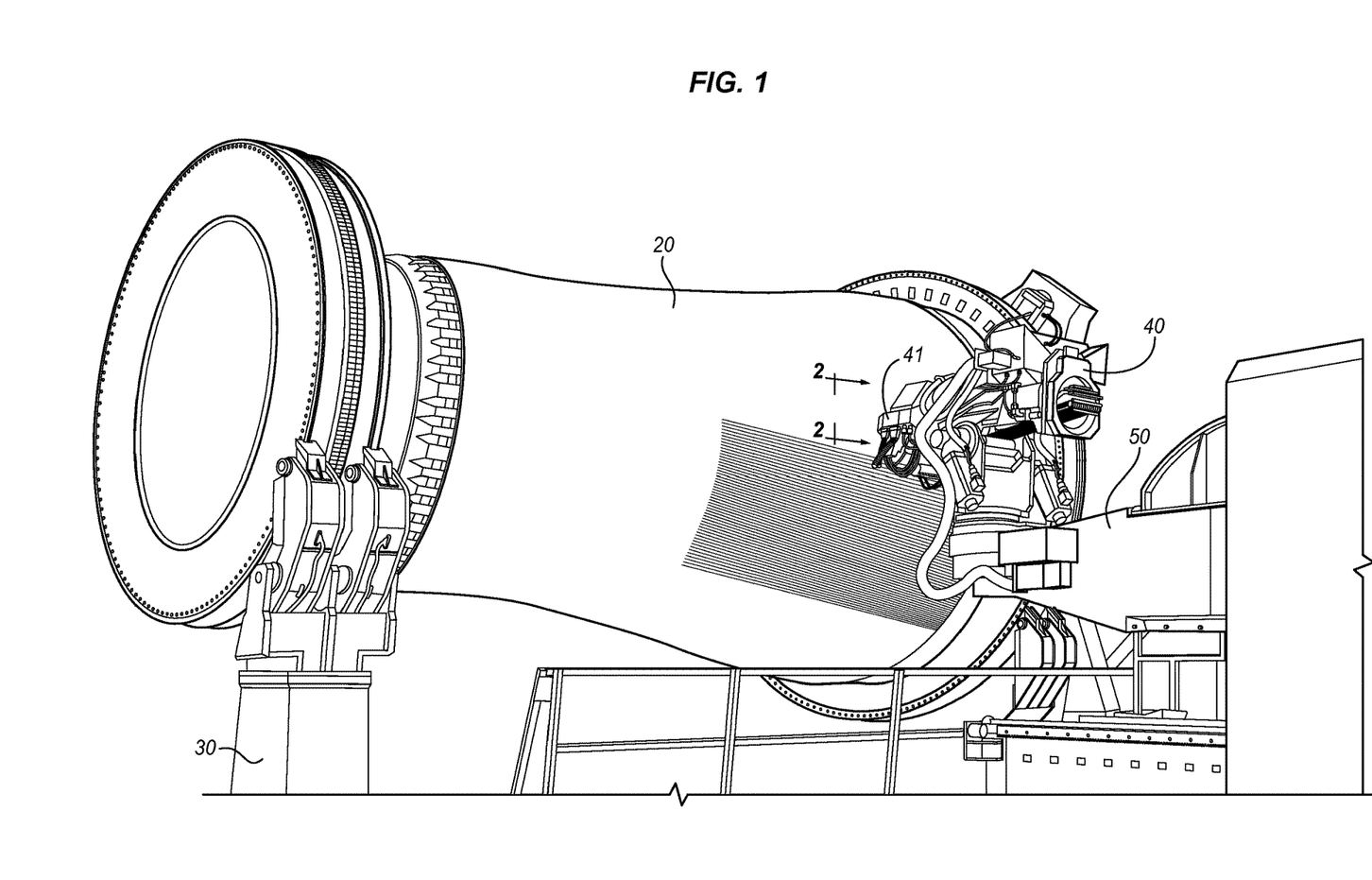
FIG. 1 illustrates an AFP machine in an exemplary embodiment.

FIG. 1 illustrates an AFP machine 40 in an exemplary embodiment. AFP machine 40 operates on composite part 20, which in this embodiment is a fuselage section for an aircraft that is held in place via rotational holder 30. AFP machine 40 is repositioned by a robot arm 50 to lay fiber tows of constituent material (shown in FIGS. 2-11) from face 41 onto composite part 20. AFP machine 40 lays-up and cuts tow to arrange fiber from one or more internal spools in order to laminate composite part 20 for curing. This process may involve laying-up multiple plies until composite part 20 is completed. Any suitable shape may be used for composite part 20, and any suitable constituent material may be used for the tows of AFP machine 40 in order to assemble components such as aircraft wings, fuselages, doors, control surfaces, etc.

Figure 2:
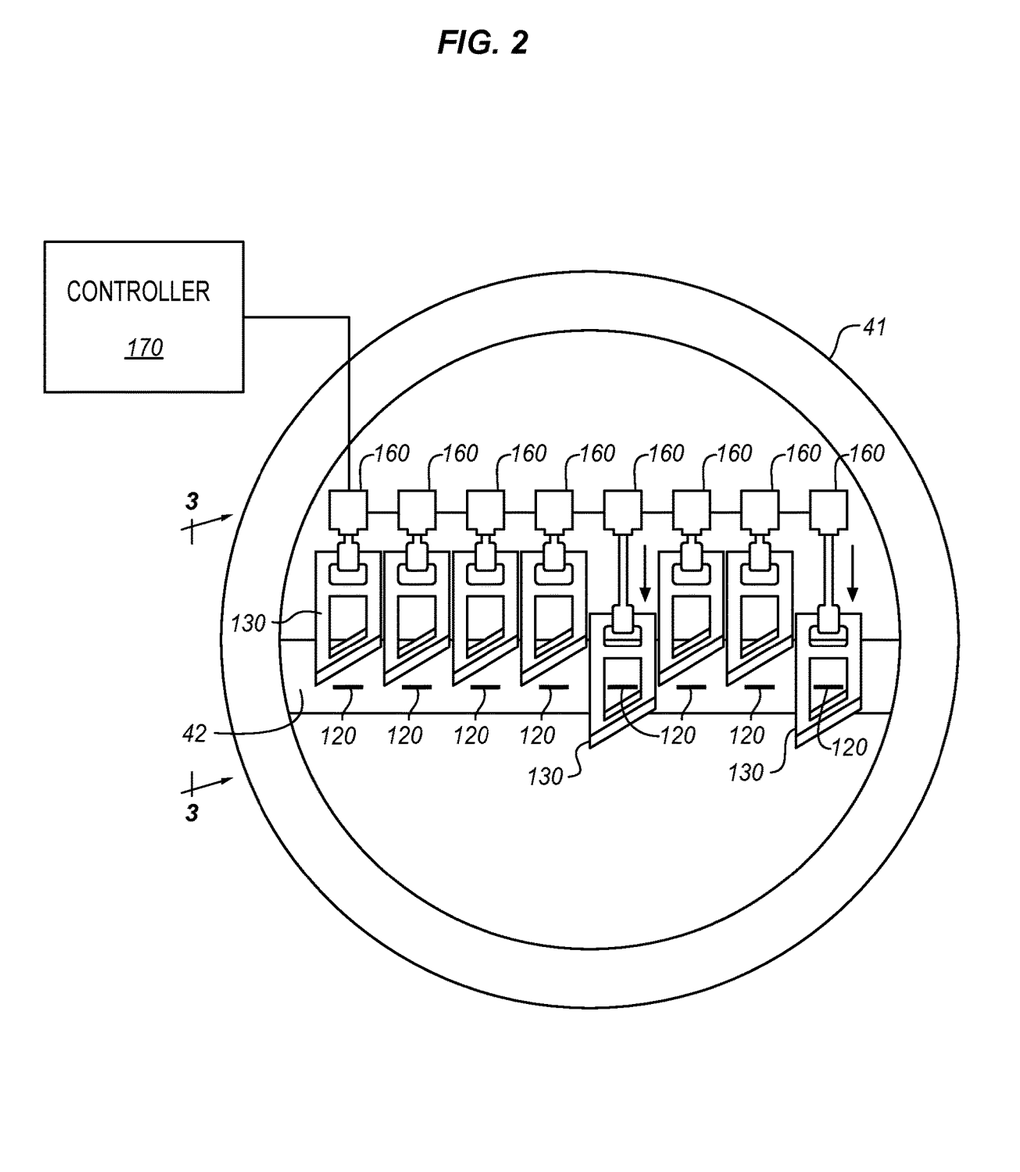
FIG. 2 illustrates a set of cutters at a face of an AFP machine in an exemplary embodiment.

FIG. 2 illustrates a set of cutters 130 at face 41 of AFP machine 40 in an exemplary embodiment, as shown by view arrows 2 of FIG. 1. In this embodiment, face 41 includes multiple bi-directional cutters 130 placed proximate to a shear plate 42. Cutters 130 are driven upwards and downwards by actuators 160 in response to electric and/or electronic instructions provided from controller 170. The instructions from controller 170 may be provided via an electronic communication channel providing electrical input that directs either the application of air pressure to an actuator 160 to change the position of an actuator 160 (i.e., upward or downward), or by sending an electronic signal to activate (or deactivate) a motor that drives the actuator 160. This causes cutters 130 to cut tows 120 at specifically programmed locations as tows 120 are extended outward (i.e., out of the page), which ensures that tows 120 are cut to desired lengths as they are applied by AFP machine 40. Controller 170 may be implemented, for example, as custom circuitry, as a processor executing programmed instructions, or some combination thereof.

Figure 3:
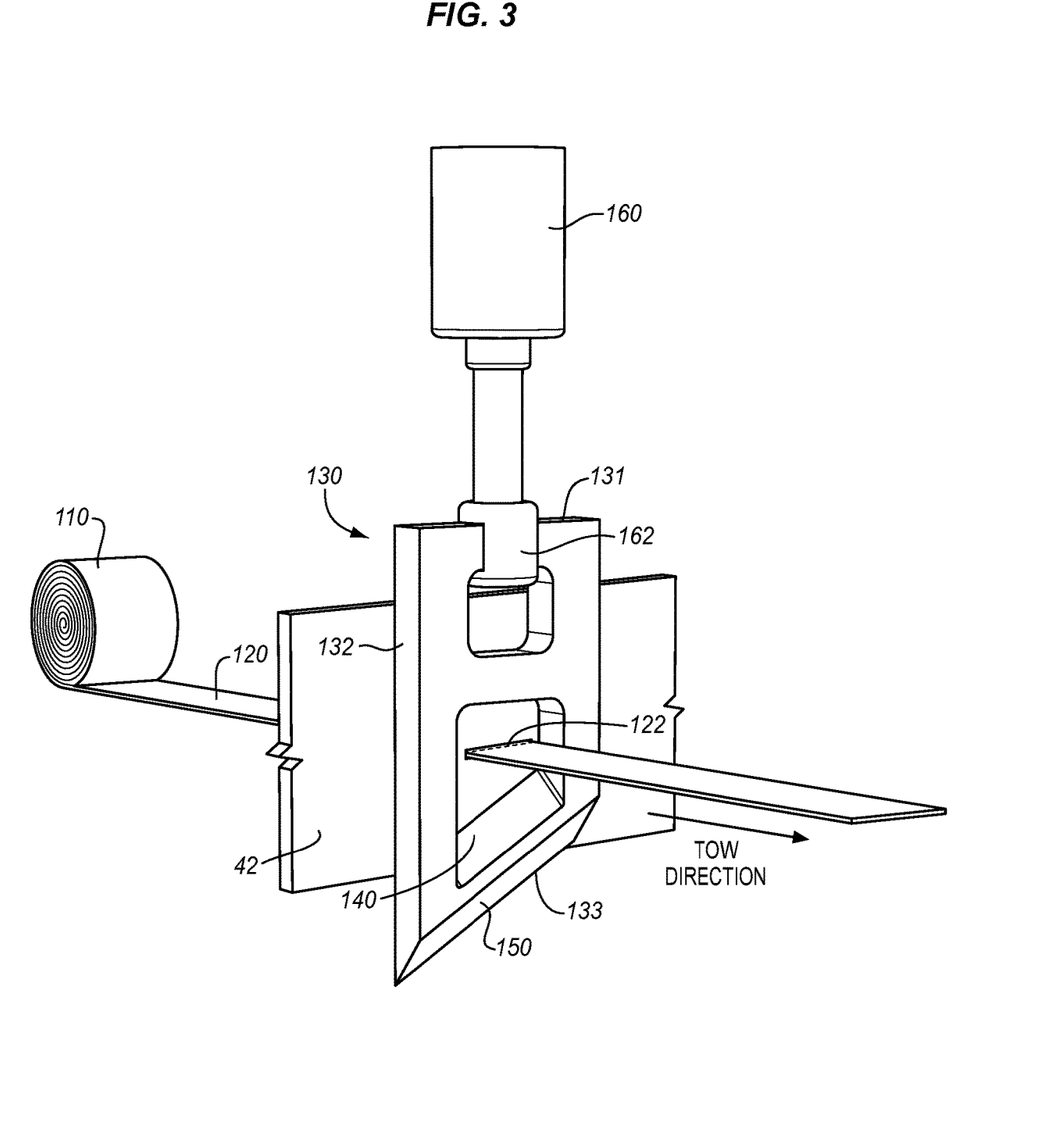
FIGS. 3-4 are diagrams of a cutter cutting a tow of fiber for an AFP machine in an exemplary embodiment.
Figure 4:
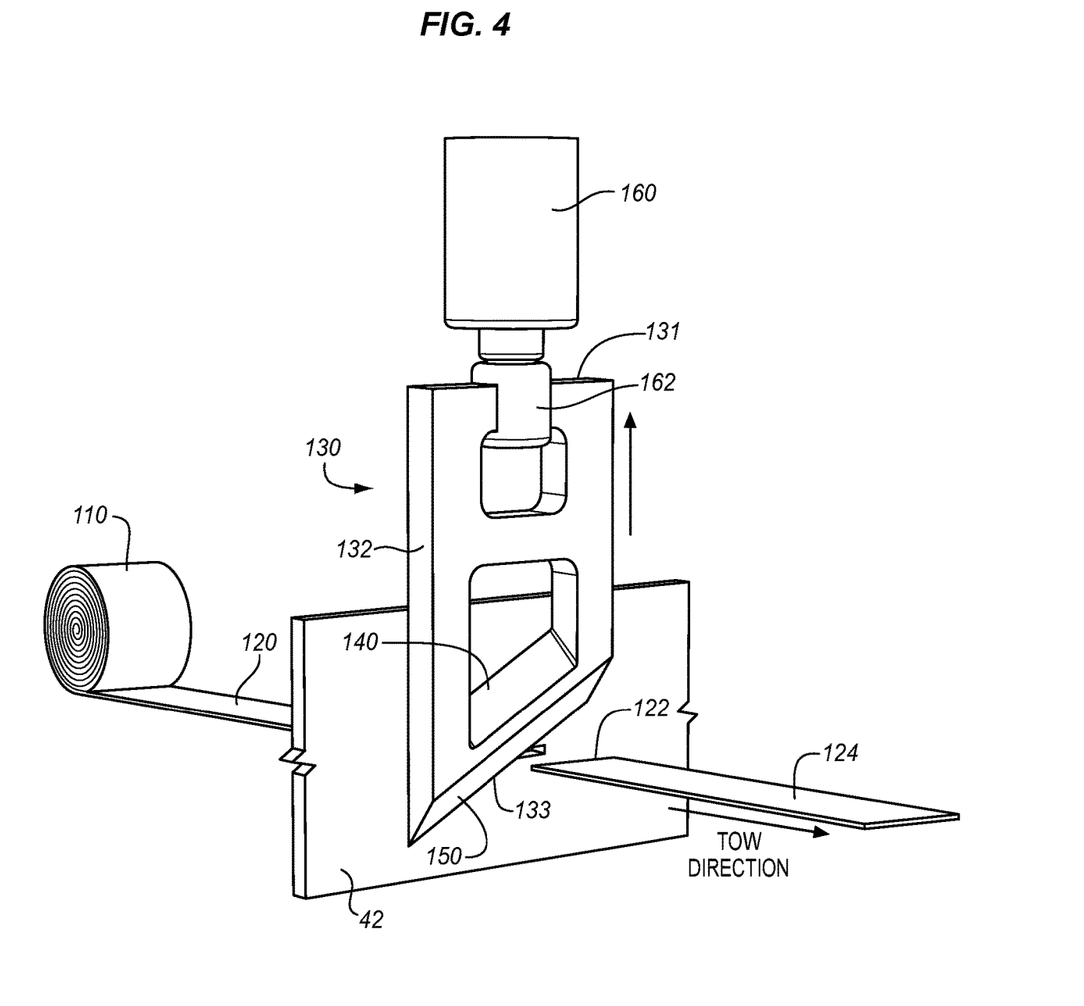

Further details of the operation of an individual cutter 130 are provided with regard to FIGS. 3-4. FIGS. 3-4 are diagrams of a cutter 130 cutting a tow 120 of fiber for AFP machine 40 in an exemplary embodiment, as shown by view arrows 3 of FIG. 2. In this embodiment, during the operation of AFP machine 40 (see FIG. 1), tow 120 is reeled off of spool 110 towards cutter 130. Tow 120 is cut by blade 150 of cutter 130 as cutter 130 is driven downwards by actuator 160, and tow 120 is cut by blade 140 of cutter 130 (e.g., at location 122) as cutter 130 is driven upwards by actuator 160. Hence, blade 140 is oriented to cut in an upward direction, while blade 150 is oriented to cut in a downward direction. In this manner, cutter 130 does not need to be reset via actuator 160 to a "start" position before making each cut. Whenever actuator 160 is driven in either direction, a cut is made. As shown in FIGS. 3-4, cutter 130 includes a cutter body 132 with an upper edge 131 and a lower edge 133.

Actuator 160 is coupled to cutter 130 at fixation element 162. Actuator 160 may comprise a two-stop air piston, a linear actuator, or any suitable drive system capable of displacing cutter 130 upward and downward. For example, in one embodiment actuator 160 comprises one or more pistons managed by air logic. Controller 170 of FIG. 2 provides commands to drive actuator 160. For example, an internal memory (not shown) of controller 170 may include instructions for when to cut tow 120 during the assembly of a composite part, and may then direct actuator 160 to move from an extended to a retracted position (or vice versa) whenever a cut should be made.

Figure 5:
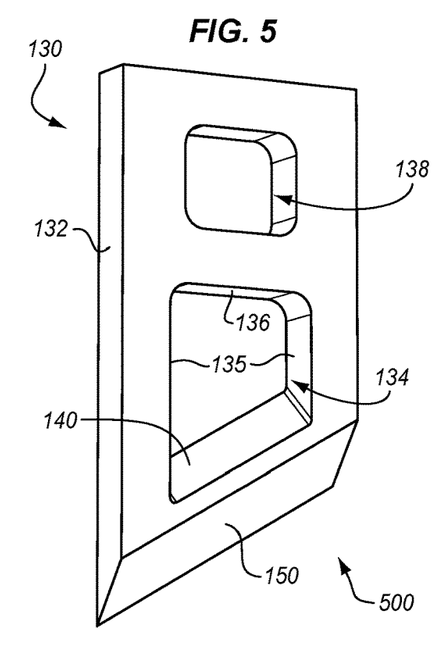
FIGS. 5-7 are views of a cutter in an exemplary embodiment.
Figure 6:
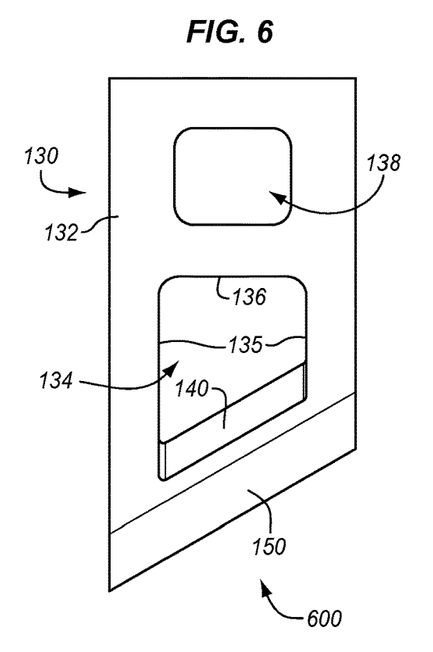
Figure 7:
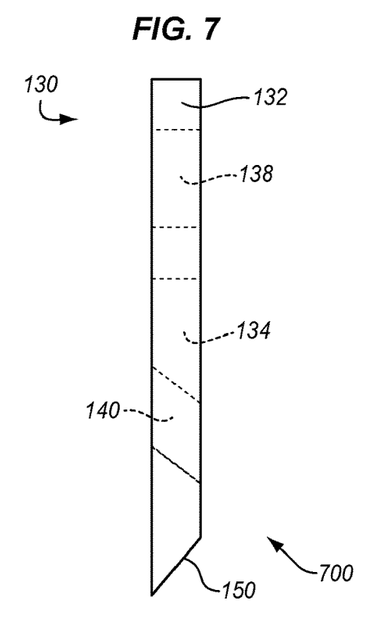

FIGS. 5-7 are further views of cutter 130 in an exemplary embodiment. Specifically, FIG. 5 is a perspective view 500, FIG. 6 is a front view 600, and FIG. 7 is a side view 700 of cutter 130. As shown in FIGS. 5-7, cutter 130 includes cutter body 132, blades 140 and 150, opening 134, and attachment hole 138. In this embodiment, blades 140 and 150 are integral with cutter body 132, while in further embodiments, blades 140 and 150 may be mounted to cutter body 132. When blades 140 and 150 are integral with cutter body 132, cutter 130 may be manufactured as a single piece without the need for assembly.

Attachment hole 138 is a location at which cutter 130 may be secured to fixation element 162 of actuator 160 (e.g., by sliding cutter 130 onto fixation element 162). Attachment hole 138 is dimensioned to mount cutter 130 to AFP machine 40 via fixation element 162 of actuator 160.

Opening 134 is defined by side edges 135, top edge 136, and blade 140. Furthermore, opening 134 is dimensioned to enable passage of a tow of fiber through the cutter body. In this embodiment, opening 134 is surrounded by edges 135, edge 136, and blade 140. However, in further embodiments opening 134 may extend through one or more of these edges, or even blade 140. When cutter 130 has been extended, tow 120 of FIGS. 1-2 slides through opening 134 (e.g., as shown in FIG. 3). When cutter 130 has been retracted, tow 120 slides underneath cutter 130 (e.g., as shown in FIG. 4). In further embodiments, tow 102 may extend through opening 134 while cutter 130 is retracted, and may slide underneath cutter 130 when cutter 130 is extended.

Figure 8:
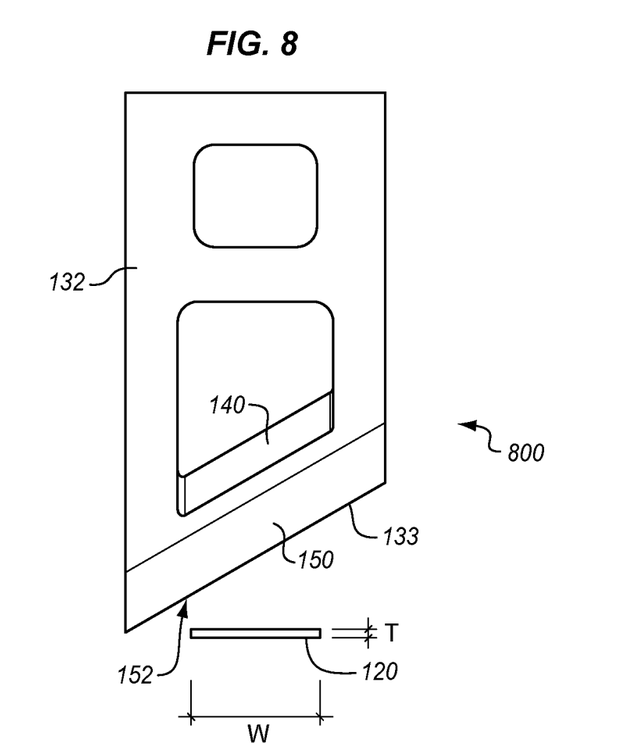
FIGS. 8-9 are diagrams of a cutter cutting a tow of fiber during a downward stroke in an exemplary embodiment.
Figure 9:
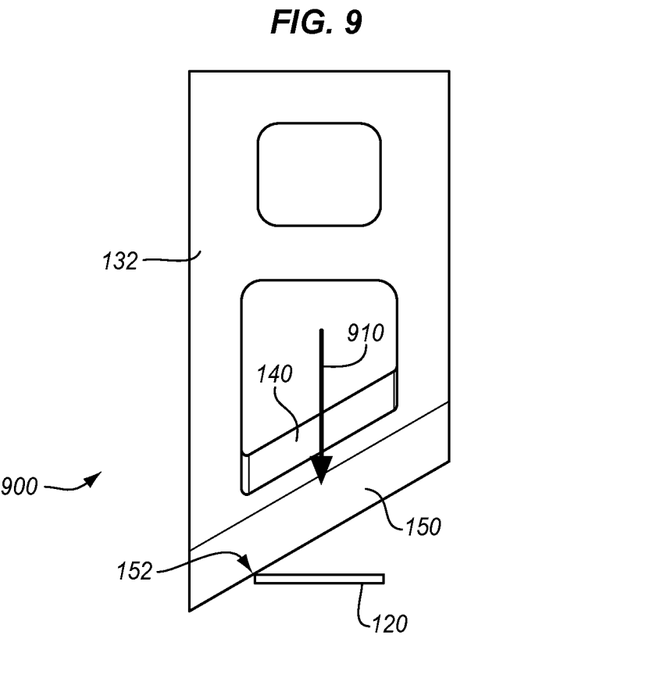

FIGS. 8-9 are diagrams 800-900 of cutter 130 cutting tow 120 during a downward stroke 910 in an exemplary embodiment. FIG. 8 illustrates that before downward stroke 910 is initiated, cutter 130 is in a retracted position above tow 120. Thus, lower edge 133 of cutter 130 is dimensioned to enable tow 120 to continue unimpeded while cutter 130 is retracted. In FIG. 9, cutter 130 is driven downwards to contact and cut tow 120 with blade 150. In this embodiment, tow 120 has a width W and a thickness T. Blade 150 is angled with respect to downward stroke 910 so that during the cut, location 152 is the first portion of blade 150 to contact a leftward edge of tow 120. In this manner, the entire force of the downward stroke 910 is at first focused upon location 152 instead of being distributed across the entirety of blade 152. As downward stroke 910 continues and the cut is made, the portion of blade 150 making the cut shifts from location 152 towards the right. Tow 120 may continue to be fed through cutter 130 after downward stroke 910 is made, enabling a further portion of tow 120 to be cut during an upward stroke of cutter 130.

Figure 10:
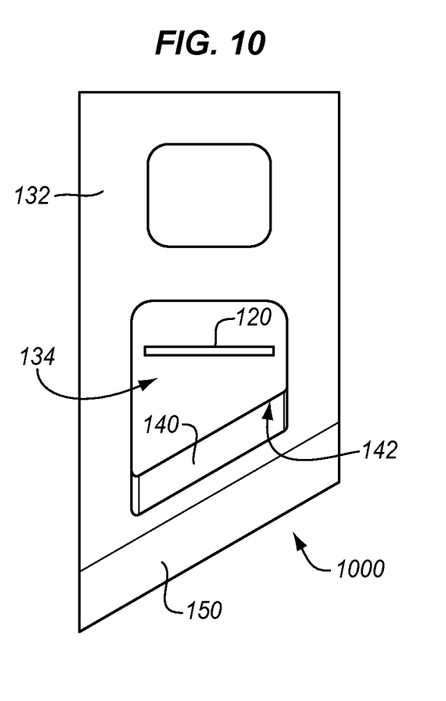
FIGS. 10-11 are diagrams of a cutter cutting a tow of fiber during an upward stroke in an exemplary embodiment.
Figure 11:
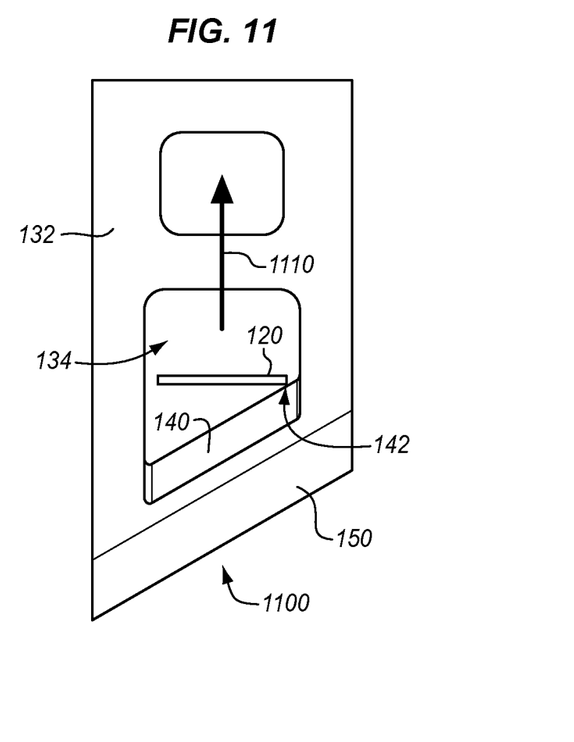

FIGS. 10-11 are diagrams 1000-1100 of a cutter 130 cutting a tow 120 of fiber during an upward stroke 1110 in an exemplary embodiment. FIG. 10 illustrates that before upward stroke 1110 is initiated, cutter 130 is in an extended position wherein tow 120 extends through opening 134. In FIG. 11, cutter 130 is driven upwards to contact and cut tow 120 with blade 140. Blade 150 is angled with respect to upward stroke 1110 so that during the cut, location 142 is the first portion of blade 140 to contact a rightward edge of tow 120. In this manner, the entire force of the upward stroke 1110 is at first focused upon location 142 instead of being distributed across the entirety of blade 152. As upward stroke 1110 continues and the cut is made, the portion of blade 140 making the cut shifts from location 142 towards the left. In further embodiments any of the blades of cutter 130 may be oriented to cut tow 120 from right to left, left to right, etc. For example, it is possible to have blades 140 and 150 oriented to initiate contact with tow 120 at the leftward edge and/or rightward edge of tow 120 as they start to cut tow 120. It is further possible to orient blade 150 to initiate its cut at the rightward edge of tow 120 and orient blade 140 to initiate its cut at the leftward edge of tow 120, and vice versa.

As used herein, the directions "upward" and "downward" are not used to specifically refer to the direction of gravity, but rather are used to indicate directions which are substantially opposed in nature (e.g., vectors that point in opposite directions).

Illustrative details of the operation of cutter 130 will be discussed with regard to FIG. 12. Assume, for this embodiment, that an operator has programmed AFP machine 40 with instructions to laminate a composite part. The instructions include directions for controller 170 to make cuts at various locations along tow 120, and also include instructions for laying-up portions of tow 120 into a complex shape via a robotic arm (not shown).

Figure 12:
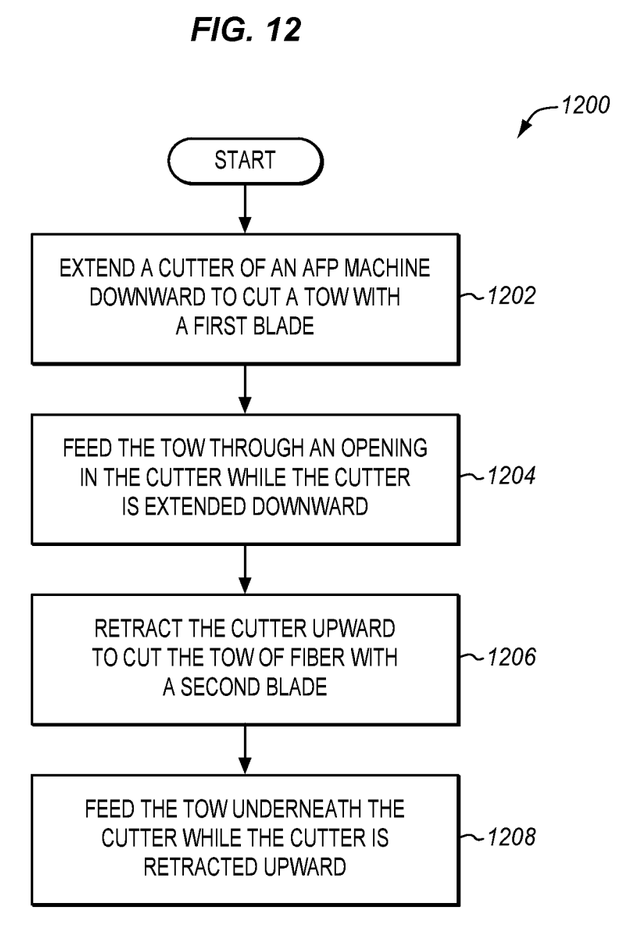
FIG. 12 is a flowchart illustrating a method for operating a cutter of an AFP machine in an exemplary embodiment.

FIG. 12 is a flowchart illustrating a method 1200 for operating cutter 130 of AFP machine 40 in an exemplary embodiment. The steps of method 1200 are described with reference to AFP machine 40 of FIG. 1, but those skilled in the art will appreciate that method 1200 may be performed in other systems. The steps of the flowcharts described herein are not all inclusive and may include other steps not shown. The steps described herein may also be performed in an alternative order.

In step 1202, controller 170 directs actuator 160 to extend cutter 130 downward to cut tow 120 with blade 150. Actuator 160 extends outward, pushing blade 150 into tow 120 and cutting tow 120 as shown in FIGS. 8-9. This action may be performed very quickly (e.g., in a range of nanoseconds over a distance of several centimeters).

In step 1204, tow 120 is fed via spool 110 through opening 134 of cutter 130 while cutter 130 is in the extended position. Thus, after a period of time a length of tow 120 is ready to be cut by cutter 130, even though cutter 130 has not yet changed position.

In step 1206, controller 170 directs actuator 160 to retract cutter 130 upward to cut tow 120 with blade 140. Actuator 140 retracts back, pulling blade 140 into tow 120 and cutting tow 120 as shown in FIGS. 10-11. Like in step 1202, this action may also be performed very quickly (e.g., in a range of nanoseconds over a distance of several centimeters).

In step 1208, tow 120 is fed via spool 110 beneath cutter 130 while cutter 130 is in the retracted position. Again, after a period of time, tow 120 is ready to be cut by cutter 130, even though cutter 130 has not been moved from where it previously completed the last cut.

Method 1200 provides a benefit over prior methods, because it enables an actuator to cut a tow by either projecting or retracting a cutter. Thus, method 1200 utilizes half of the number of physical motions to perform the same number of cuts as prior systems. Furthermore, since cuts are evenly distributed between blades 140 and 150 at cutter 130, the functional lifetime of cutter 130 (in terms of number of cuts) is effectively doubled. This in turn saves the cost of new cutters, and reduces downtime at AFP machine 100 spent replacing cutters.

Cutter 130 may be used to cut any suitable fiber material, such as resin-impregnated carbon fiber, glass fiber, etc. Cutter 130 may be made out of any suitable material, such as steel, titanium, ceramics, alloys, etc.

Figure 13:
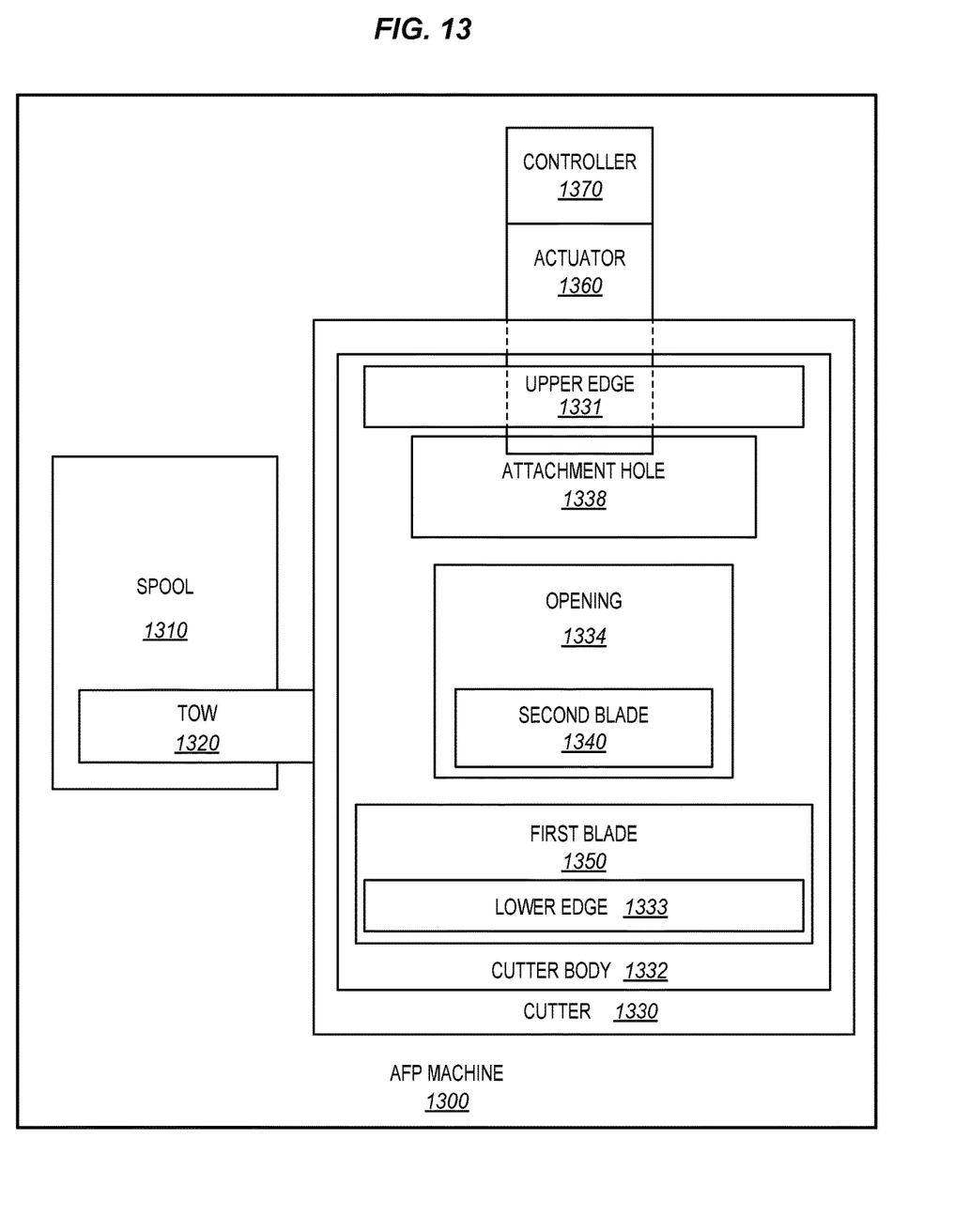
FIG. 13 is a block diagram of an AFP machine in an exemplary embodiment.

FIG. 13 is a block diagram of an AFP machine 1300 in an exemplary embodiment. As shown in FIG. 13, AFP machine 1300 includes cutter 1330, spool 1310, tow 1320, controller 1370, and actuator 1360. Controller 1370 manages the operations of actuator 1360 to reposition cutter 1330, while spool 1310 is operated to extend tow 1320 outwards towards cutter 1330. In this embodiment, cutter 1330 comprises cutter body 1332. Cutter body 1332 includes upper edge 1331, and lower edge 1333. First blade 1350 includes lower edge 1333 of cutter body 1332. Opening 1334 is partially defined by second blade 1340, in that second blade 1340 acts as a lower edge of opening 1334. Attachment hole 1338 is dimensioned for attachment to actuator 1360. Thus, while in operation, motion of actuator 1360 directly results in motion of cutter 1330.

Figure 14:
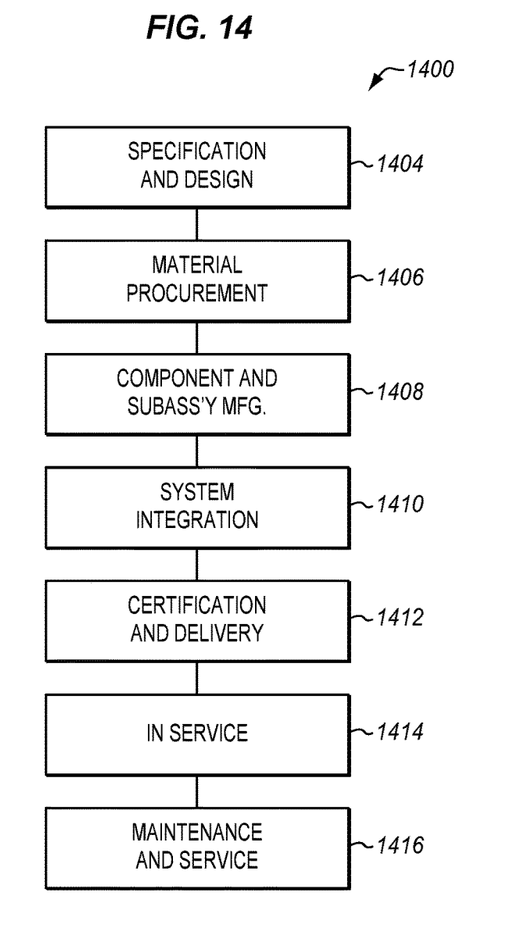
FIG. 14 is a flow diagram of aircraft production and service methodology in an exemplary embodiment.
Figure 15:
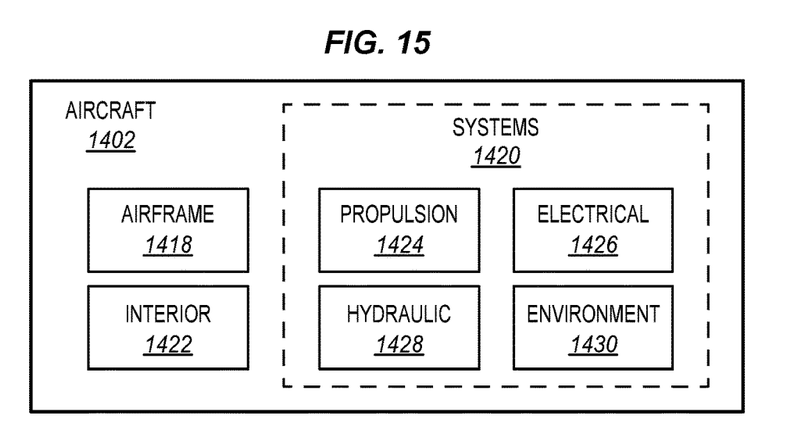
FIG. 15 is a block diagram of an aircraft in an exemplary embodiment.

Referring more particularly to the drawings, embodiments of the disclosure may be described in the context of an aircraft manufacturing and service method 1400 as shown in FIG. 14 and an aircraft 1402 as shown in FIG. 15. During pre-production, exemplary method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine maintenance and service 1416 (which may also include modification, reconfiguration, refurbishment, and so on).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by exemplary method 1400 may include an airframe 1418 with a plurality of systems 1420 and an interior 1422. Examples of high-level systems 1420 include one or more of a propulsion system 1424, an electrical system 1426, a hydraulic system 1426, and an environmental system 1430. Any number of other systems may be included. Although an aerospace example is shown, the principles of the invention may be applied to other industries, such as the automotive industry.

Apparatus and methods embodied herein may be employed during any one or more of the stages of the production and service method 1400. For example, components or subassemblies corresponding to production stage 1408 may be fabricated or manufactured in a manner similar to components or subassemblies produced while the aircraft 1402 is in service. Also, one or more apparatus embodiments, method embodiments, or a combination thereof may be utilized during the production stages 1406, 1408, and 1410, for example, by substantially expediting assembly of or reducing the cost of an airframe 1418 of an aircraft 1402. Similarly, one or more of apparatus embodiments, method embodiments, or a combination thereof may be utilized while the aircraft 1402 is in service, for example and without limitation, to maintenance and service 1416.

In one embodiment, a composite part is created for a wing, fuselage, and/or engine cowling of airframe 1218 based on the operations described above and utilizing the cutters described above, during component and subassembly manufacturing 1108. This composite part may then be assembled into an aircraft in system integration 1110, and then be utilized in service 1114 until wear renders the composite unusable. Then, in maintenance and service 1116, the composite part may be discarded, patched, and/or replaced with a newly manufactured part. AFP machines (e.g., AFP machine 40) may be utilized throughout component and subassembly manufacturing 1108 in order to manufacture part 20.

Any of the various electronic elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method of cutting for an Automated Fiber Placement (AFP) machine, comprising:
   driving a cutter of the AFP machine downward to cut a tow of fiber at the AFP machine with a first blade of the cutter; and
   driving the cutter of the AFP machine upward to cut the tow at the AFP machine with a second blade of the cutter.

2. The method of claim 1 further comprising:
   continuously feeding the tow as the cutter is driven.

3. The method of claim 1, further comprising:
   feeding the tow through an opening in the cutter after the cutter is driven downward.

4. The method of claim 1, further comprising:
   feeding the tow underneath the cutter after the cutter is driven upward.

5. The method of claim 1 further comprising:
   feeding the tow through the cutter after the cutter has been driven downward; and
   cutting the tow fed through the cutter by driving the cutter upward.

6. The method of claim 1 wherein:
   each driving of the cutter is performed in response to an electronic signal that activates a motor which drives an actuator for the cutter.

7. The method of claim 1 wherein:
   driving the cutter downward causes the first blade of the cutter to initiate its cut at a rightward edge of the tow; and
   driving the cutter upward causes the second blade of the cutter to initiate its cut at a leftward edge of the tow.

8. The method of claim 1 wherein:
   driving the cutter downward causes the first blade of the cutter to initiate its cut at a leftward edge of the tow; and
   driving the cutter upward causes the second blade of the cutter to initiate its cut at a rightward edge of the tow.

9. The method of claim 1 further comprising:
   driving multiple cutters of the AFP machine downward to cut multiple tows of fiber at the AFP machine; and
   driving multiple cutters of the AFP machine upward to cut multiple tows of fiber at the AFP machine.

10. A non-transitory computer readable medium embodying programmed instructions which, when executed by a processor, are operable for performing a method comprising:
    driving a cutter of the AFP machine downward to cut a tow of fiber at the AFP machine with a first blade of the cutter; and
    driving the cutter of the AFP machine upward to cut the tow at the AFP machine with a second blade of the cutter.

11. A method of cutting for an Automated Fiber Placement (AFP) machine, comprising:
    receiving, at a motor, an electronic signal to activate;
    driving an actuator via the motor in response to receiving the electronic signal to activate;
    displacing a cutter of the AFP machine downward via the actuator to cut a tow of fiber at the AFP machine with a first blade of the cutter as the actuator is driven; and
    receiving, at the motor, an additional electronic signal to activate;
    driving the actuator via the motor in response to receiving the additional electronic signal to activate;
    driving the cutter of the AFP machine upward via the actuator to cut the tow at the AFP machine with a second blade of the cutter as the actuator is driven.

12. The method of claim 11 further comprising:
    continuously feeding the tow.

13. The method of claim 11 further comprising:
    feeding the tow through an opening in the cutter after the cutter is displaced downward.

14. The method of claim 11 further comprising:
    feeding the tow underneath the cutter after the cutter is driven upward.

15. The method of claim 11 further comprising:
    feeding the tow through the cutter after the cutter has been driven downward; and
    cutting the tow fed through the cutter by driving the cutter upward.

16. The method of claim 11 further comprising:
    each driving of the cutter is performed in response to an electronic signal that activates a motor which drives an actuator for the cutter.

17. The method of claim 11 wherein:
    displacing the cutter downward causes the first blade of the cutter to initiate its cut at a rightward edge of the tow; and
    driving the cutter upward causes the second blade of the cutter to initiate its cut at a leftward edge of the tow.

18. The method of claim 1 wherein:
    cutting the tow of fiber comprises cutting carbon fiber.

19. The medium of claim 10 wherein:
cutting the tow of fiber comprises cutting carbon fiber.
20. The method of claim 11 wherein:
cutting the tow of fiber comprises cutting carbon fiber.

\* \* \* \* \*